Aug. 3, 1937. A. L. SHUTTER 2,088,669
FISH LURE
Filed Nov. 7, 1936
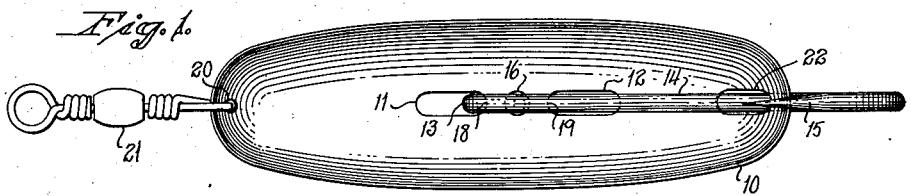
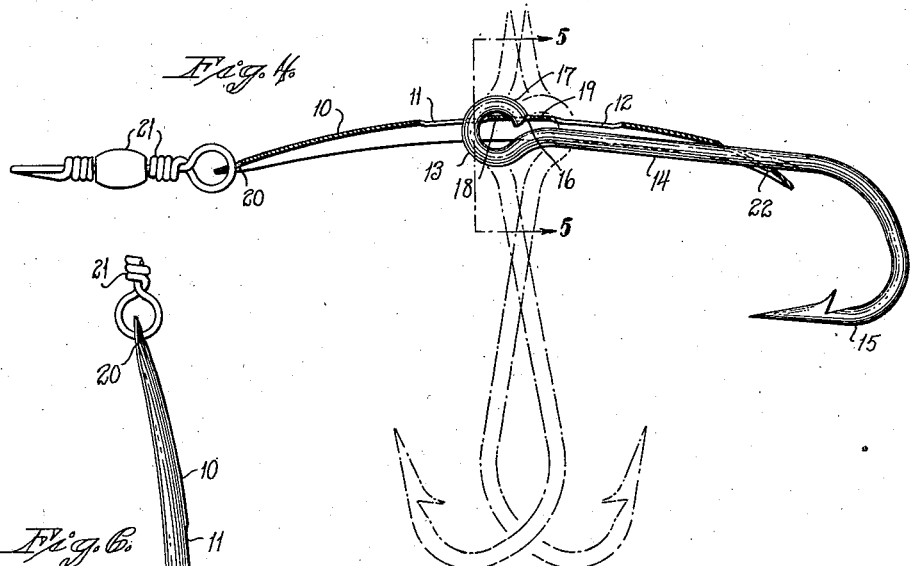
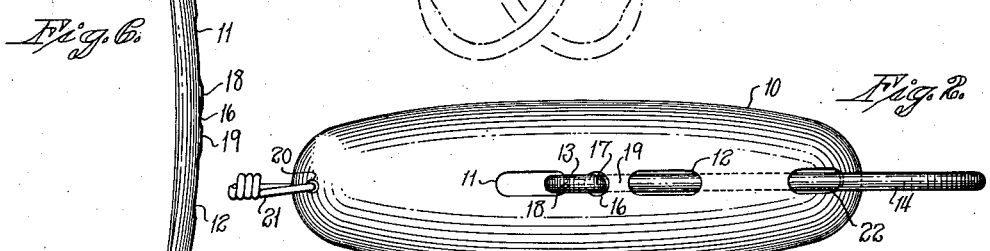
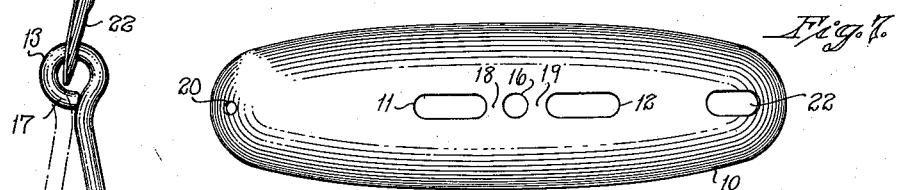
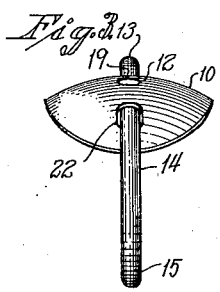
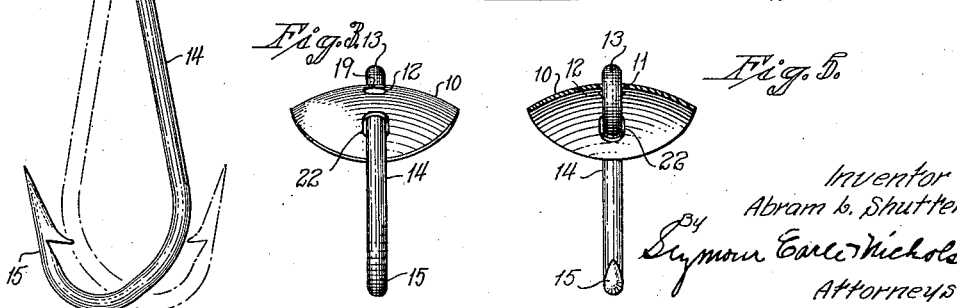
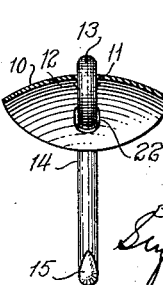

Patented Aug. 3, 1937

2,088,669

UNITED STATES PATENT OFFICE 2,088,669

FISH LURE

Abram L. Shutter, West Haven, Conn.

Application November 7, 1936, Serial No. 109,698

3 Claims. (Cl. 43—45)

My invention relates to an improved fish lure, the object being to produce a simple, cheap, convenient, dependable and effective lure providing a wide range of easy attachment of the hook to the spoon, thus enabling each fisherman to present to the prospective fish the particular lure which he personally thinks will be successful— that being one of the pleasures attending the use of artifical bait, such as whirling spoons and legions of fancy flies.

A further object is to provide a fish lure in which the hook may be rigidly or loosely attached directly to a spring-sheet-metal spoon without the use of supplemental fastening means.

A further object of my invention is to provide a fish lure in which the hook may be fastened to either face of the spoon, or to the free end thereof.

With these ends in view, my invention consists in a fish lure comprising a sheet-metal spoon and a hook having an eye, the said spoon having an opening adapted to receive the end of the eye of the hook when the said eye is open and also having a larger flanking opening adapted to bodily receive the eye of the hook and separated from the opening first mentioned by a bridge by which the hook is suspended from the spoon when the spoon and the eye of the hook are rove together through the said openings.

My invention further consists in a fish lure comprising a sheet-metal spoon and a hook having an eye, the said spoon having an opening adapted to receive the end of the eye of the hook when the said eye is open and also having two larger flanking openings, each adapted to bodily receive the eye of the hook and each separated from the opening first mentioned by a bridge by which the hook is suspended from the spoon when the spoon and the eye of the hook are rove together through two of the said openings.

With the above and other objects in view, as will appear to those skilled in the art from the present disclosure, this invention includes all features in the said disclosure which are novel over the prior art.

Fig. 1 is an inside face view of my improved fish lure;

Fig. 2 is an outside face view of the same;

Fig. 3 is a right-hand end view thereof;

Fig. 4 is a view thereof in longitudinal section;

Fig. 5 is a sectional view on the line 5—5 of Fig. 4;

Fig. 6 is an edge view showing another position of the hook; and

Fig. 7 is an outside face view of the spoon from which the hook has been detached.

In carrying out my invention, I employ a concavo-convex, longitudinally-bowed, spring-sheet-metal spoon 10 which is provided with three perforations comprising, as shown, two corresponding slots 11 and 12 adapted in size for the bodily reception of the open eye 13 of a hook 14 having the usual barbed point 15. Intermediate the inner ends of the slots 11 and 12 is a circular perforation 16 adapted to receive the actual end 17 of the eye 13, the said end being hooked into it after the eye has been bodily introduced into either one of the flanking slots 11 and 12 from either face of the spoon. By thus manipulating the hook, the eye thereof has its end 17 hooked over one or the other of two corresponding bridges 18 and 19 formed between the inner ends of the said slots 11 and 12 and the central perforation 16. The hook is thus freely suspended from the spoon by the bridge 18 or 19 thereof, as indicated in broken lines in Fig. 4, in which the hook is shown as freely suspended from the inner and outer faces of the spoon by its eye 13 and the bridge 18 or its complementary bridge 19. The above described manner of directly attaching the hook to the spoon is made possible by the described provision of the spoon with perforations 11 and 12 large enough to bodily receive the eye of the hook to an extent sufficient to permit the opening of the eye to be brought into registration with one or the other of the said bridges, thus enabling it to pass within the eye, which is thus virtually hooked over one or the other of the bridges, whereby the eye of the hook is, in effect, rove through one or the other of the perforations midway the length of the spoon. One of the slots, or its equivalent, may be omitted without impairing my improved lure further than to decrease the range of the attachment of the hook to the spoon.

At the extreme inner end of the spoon it is perforated as at 20 for the attachment of an ordinary swivel 21, while adjacent its outer or free end it is formed with a slot-like perforation 22 through which the eye 13 may be hooked when open. The perforation 22 is made long enough so that after the eye of the hook has been rove through it, the shank of the hook may be laid down into substantially the same plane as the spoon, as shown in Fig. 4.

It should be here explained that the eye 13 of the hook is left slightly open as the lure is supplied to the purchaser, as shown in Fig. 4.

Let it be assumed, for instance, that it is desired to rigidly attach the hook to the spoon to form a solid unit therewith. With this end in view, the end 17 of the open eye 13 of the hook is passed from the convex outer to the concave inner face of the spoon through the slot 22 therein. The hook is then manipulated so that the shank thereof is passed through the slot 22 and the end 17 of the eye 13 brought into registration with the slot 11 in the spoon. The eye is then pressed from the concave inner toward the convex outer face thereof, so as to extend partly through the slot 11, thus causing the spoon to be longitudinally sprung and placed under tension. By drawing the hook longitudinally outwardly toward the free end of the spoon, the end 17 of the open eye 13 of the said hook will be caused to ride over the bridge 18, and will snap into the opening 16 of the spoon to ultimately assume the position shown in Fig. 4. Thus, the hook will be connected with the spoon through the bridge 18, the hook being now rigidly held by the tension placed upon the spoon when the eye 13 of the hook is pressed from the inside to the outside of the spoon through the slot 11, as before described. The hook is thus rigidly connected with the spoon so as to form a unit therewith without any intermediate fastening means and without requiring the use of any tool of any description, the operation of thus rigidly connecting the hook with the spoon being merely an easily-performed hand manipulation. By placing the hook and spoon under longitudinal pressure, so as to lift the end 17 of the eye 13 of the hook out of the opening 16 in the spoon, the hook may be moved inwardly so that the end 17 of its eye 13 will clear the bridge 18 and pass thence bodily through from the outer to the inner face of the spoon, through the slot 11, after which the hook may be drawn outwardly and its eye easily worked through the slot 22 of the spoon. The hook may also be loosely attached to the free end of the spoon by passing the end 17 of its open eye 13 through the slot 22 and then closing the eye, as shown in Fig. 6.

It will be understood from the foregoing that the hook as supplied to the buyer has its eye open, to be closed by the buyer after its attachment to the spoon in any one of the positions described and shown, save in the single instance where the elasticity of the spoon is relied upon to rigidly hold the hook to the spoon, for which purpose the open eye must be rove, so to speak, through the perforations in the spoon.

The provision of the spoon with the perforations 11, 12, 16 and 22 adapts it for the direct attachment of the hook upon its concave inner or its convex outer face without the employment of any intermediate fastening devices and without the employment of any special tools or anything more than some means, such as pliers or a hammer, for closing the eye of the hook in its several positions of attachment, save in the single position in which the spring of the spoon is brought into play for rigidly holding it in place.

My improved fish lure as thus constructed enables the user to easily gratify his preference for the attachment of the hook to the lure in one of several positions without the use of tools and with perfect ease.

It is obvious that my improved device may be very cheaply made, as it is only necessary to strike up the spoon with perforations or openings as shown, and it is of especial convenience to the user as there are no supplemental parts to lose or become deformed.

It should be particularly noted that whereas in fish lures of the prior art intermediate means for attaching the hook to the spoon have been resorted to, in my invention, by the provision of the spoon with certain perforations and the employment of a hook with an open eye, I am enabled to attach the hook directly to the spoon without intermediate attachment devices and either rigidly or loosely.

The invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. In a fish lure, the combination with a spoon having an opening adjacent the free end thereof and two openings located intermediate its respective opposite ends and spaced apart to form a suspension-bridge between them; and a hook having an open eye whereby the hook may be rove through the opening in the free end of the spoon and also rove through the two said intermediate openings for the entrance of the bridge into the eye of the hook.

2. In a fish lure, the combination with a spoon having three perforations arranged in line midway between its ends and spaced apart to form suspension-bridges located between their adjacent ends; and a hook having a partly-open eye, the two outer of the three perforations being adapted in size to receive the said eye sufficiently to permit either of the two bridges to pass into the opening of the open eye of the hook for the direct connection of the hook with the spoon.

3. In a fish lure, the combination with a spoon having a perforation adjacent its free end and three perforations located midway between its ends in line with the perforation first mentioned, the said three perforations comprising a central circular perforation and two elongated perforations from which the central perforation is separated by suspension-bridges; and a hook having an open eye adapted to be rove through the perforation adjacent the end of the spoon and also to be received in one of the said elongated perforations for the entrance of one or the other of the said bridges into its open eye.

ABRAM L. SHUTTER.